(12) United States Patent
Wu et al.

(10) Patent No.: US 12,276,196 B2
(45) Date of Patent: Apr. 15, 2025

(54) THREE-LEVEL PREVENTION AND CONTROL METHOD FOR ROCK BURST ROADWAY

(71) Applicant: CCTEG COAL MINING RESEARCH INSTITUTE, Beijing (CN)

(72) Inventors: Yongzheng Wu, Beijing (CN); Yukai Fu, Beijing (CN); Xiaowei Chu, Beijing (CN); Jinyu Chen, Beijing (CN); Jie He, Beijing (CN); Xinhua Liu, Beijing (CN); Xianzhi Meng, Beijing (CN)

(73) Assignee: CCTEG COAL MINING RESEARCH INSTITUTE, Beijing (CN)

( * ) Notice: Subject to any disclaimer, the term of this patent is extended or adjusted under 35 U.S.C. 154(b) by 186 days.

(21) Appl. No.: 18/006,561

(22) PCT Filed: Apr. 15, 2021

(86) PCT No.: PCT/CN2021/087397
§ 371 (c)(1),
(2) Date: Jan. 23, 2023

(87) PCT Pub. No.: WO2022/110615
PCT Pub. Date: Jun. 2, 2022

(65) Prior Publication Data
US 2023/0296021 A1   Sep. 21, 2023

(30) Foreign Application Priority Data
Nov. 26, 2020 (CN) .......................... 202011354530.8

(51) Int. Cl.
*E21D 9/00* (2006.01)

(52) U.S. Cl.
CPC .................................. *E21D 9/001* (2013.01)

(58) Field of Classification Search
CPC ......... E21D 9/001; E21D 19/00; E21D 19/02; E21D 19/04; E21D 23/03
(Continued)

(56) References Cited

U.S. PATENT DOCUMENTS

2019/0316454 A1\* 10/2019 Huang .................... E21C 41/18

FOREIGN PATENT DOCUMENTS

| CN | 102182482 | \* | 9/2011 |
| CN | 102182482 A | | 9/2011 |

(Continued)

OTHER PUBLICATIONS

First Chinese Office Action issued May 28, 2021 in connection with Chinese Patent Application No. 2020113545308.
(Continued)

*Primary Examiner* — Sunil Singh
(74) *Attorney, Agent, or Firm* — John P. White

(57) ABSTRACT

A three-level prevention and control method for a rock burst roadway, the method comprising: pre-weakening a thick and hard rock layer above a roadway before the roadway is excavated; carrying out prestress support, pressure relief and reinforcement when the roadway is excavated; and carrying out stress transfer on an advance abutment pressure, and arranging a composite energy absorption protective structure around the roadway before the mining of a working face. By coordinating the spatio-temporal relationship between pressure relief, support and prevention, the energy dissipation in the rock burst roadway is changed from an unstable, disorderly and uncontrollable dissipation state to a stable, orderly and controllable dissipation state.

6 Claims, 1 Drawing Sheet

(58) Field of Classification Search
USPC .............................................. 405/288, 302.2
See application file for complete search history.

(56) References Cited

FOREIGN PATENT DOCUMENTS

| | | | |
|---|---|---|---|
| CN | 103278055 | A | 9/2013 |
| CN | 103557020 | A | 2/2014 |
| CN | 103758570 | A | 4/2014 |
| CN | 104005765 | A | 8/2014 |
| CN | 104790985 | A | 7/2015 |
| CN | 107083961 | * | 8/2017 |
| CN | 107083961 | A | 8/2017 |
| CN | 109611130 | A | 4/2019 |
| CN | 110318761 | A | 10/2019 |
| CN | 111305876 | A | 6/2020 |
| CN | 111322048 | A | 6/2020 |
| CN | 111720139 | A | 9/2020 |
| CN | 111734463 | A | 10/2020 |
| CN | 111911201 | A | 11/2020 |
| CN | 112431596 | A | 3/2021 |
| SU | 1186798 | A1 | 10/1985 |
| SU | 1221373 | A1 | 3/1986 |

OTHER PUBLICATIONS

Second Chinese Office Action issued May 15, 2021 in connection with Chinese Patent Application No. 2020113545308.
International Search Report issued Aug. 2, 2021 in connection with PCT International Application No. PCT/CN2021/087397.
Written Opinion of the International Searching Authority issued Aug. 2, 2021 in connection with PCT International Application No. PCT/CN2021/087397.

* cited by examiner

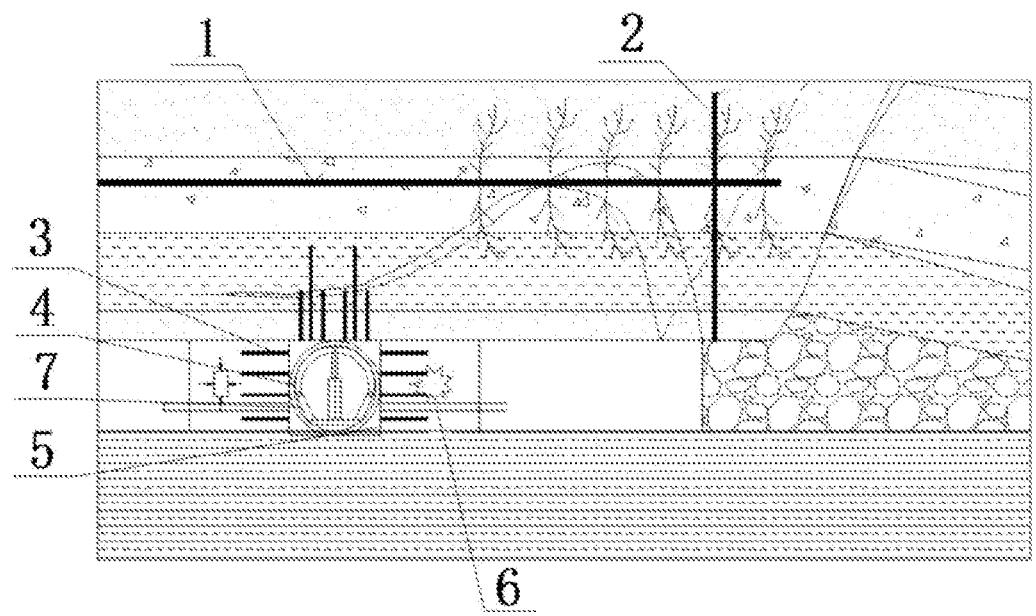

THREE-LEVEL PREVENTION AND CONTROL METHOD FOR ROCK BURST ROADWAY

CROSS-REFERENCE TO RELATED APPLICATION

The present application is a U.S. National Stage Application under 35 USC § 371 of PCT International Application No. PCT/CN2021/087397, filed Apr. 15, 2021, and claims priority to Chinese Patent Application No. 202011354530.8, filed on Nov. 26, 2020, entitled "Three-Level Prevention and Control Method for Rock Burst Roadway", each of which is hereby incorporated by reference in its entirety.

FIELD

The present application relates to the field of roadway construction method, in particular to a three-level prevention and control method for roadway rock burst.

BACKGROUND

Rock burst refers to a sudden dynamic phenomenon along with violent destruction in a coal mining space due to an instantaneous release of elastic energy of coal and rock mass. A destruction process of coal and rock mass is accompanied by vibration, loud noise and air billow, which is very destructive and is one of major disasters affecting the safety of deep mines.

Stress control and anti-impact support are two key means to control surrounding rock of a rock burst roadway. Experts in related art have carried out a lot of work in the above two key means, but they rarely do research on interaction mechanism and collaborative prevention and control technology of three prevention and control means of pressure relief, support, and protection. At present, the rock burst roadway is mainly supported by ordinary bolts, U-shaped steel, O-shaped sheds and other supporting methods. These supporting methods are prone to be unstable and destructed under an action of rock burst, and cannot effectively prevent a deformation destruction of the rock burst roadway.

SUMMARY

The present application provides a three-level prevention and control method for roadway rock burst, to solve defects of poor prevention and control effect caused by a lack of research on interaction mechanism and collaborative prevention and control technology of three prevention and control means of pressure relief, support and protection in the related art.

A three-level prevention and control method for roadway rock burst according to the present application, including:
  before digging a roadway, pre-weakening a thick and hard rock stratum above the roadway;
  during digging the roadway, performing a pre-stress support, a pressure relief, and a reinforcement; and
  before stoping at working-face, transferring a stress of an advanced abutment pressure, and arranging a composite energy-absorbing protective structure around the roadway.

In an embodiment, before digging the roadway, the pre-weakening the thick and hard rock stratum above the roadway includes: before digging the roadway, pre-weakening the thick and hard rock stratum above the roadway by using a regional staged hydraulic fracturing technology of long borehole.

In an embodiment, during digging the roadway, the performing the pre-stress support, the pressure relief, and the reinforcement includes: during digging the roadway, performing the pre-stress support by using a bolt rod and/or a bolt cable, performing the pressure relief by casing drilling and performing the reinforcement by grouting.

In an embodiment, before stoping at the working-face, the transferring the stress of the advanced abutment pressure includes: before stoping at the working-face, transferring the stress of the advanced abutment pressure by using a local hydraulic fracturing technology of medium and short borehole.

In an embodiment, the arranging the composite energy-absorbing protective structure around the roadway includes: arranging a protective support in the roadway and filling a buffer energy-absorbing cushion between the protective support and a surrounding rock of the roadway.

In an embodiment, the three-level prevention and control method for roadway rock burst further includes: providing an anti-impact energy-absorbing material on a top beam of the protective support.

In an embodiment, the three-level prevention and control method for roadway rock burst further includes: arranging a hinged triangular anti-impact device on a top beam of the protective support, and arranging the hinged triangular anti-impact device on a bottom beam of the protective support.

In an embodiment, the protective support is a frame structure formed of splayed columns.

In the three-level prevention and control method for roadway rock burst according to the present application, the impact energy and stress on the roadway can be reduced from perspectives of dynamic load and static load by performing pressure relief on far field and near field of surrounding rock of the roadway; capacities of self-bearing and impact resistance of the surrounding rock of the roadway can be improved by using an active support combined with surrounding rock structure remodeling technology; and an energy dissipation capacity in a roadway space is improved by using the composite energy-absorbing protective structure, and a balance between the impact energy and dissipated energy of the roadway is finally reached. In the present application, an energy dissipation process of the rock burst roadway is changed from unstable, disorderly and uncontrollable dissipation state to stable, orderly and controllable dissipation state by coordinating a spatio-temporal relationship between pressure relief, support, and protection.

BRIEF DESCRIPTION OF DRAWINGS

In order to more clearly illustrate the solutions according to the present application or the related art, the accompanying drawings used in the description of the embodiments of the present application or the related art will be briefly introduced below. It should be noted that the drawings in the following description are only part embodiments of the present application. For those of ordinary skill in the art, other drawings can be obtained according to these drawings without creative efforts.

FIG. 1 is a schematic diagram of adopting a three-level prevention and control method for roadway rock burst according to an embodiment of the present application.

Reference numerals, 1: long hole hydraulic fracturing; 2: medium and short hole hydraulic fracturing; 3: pre-stressed bolt mesh cable support; 4: anti-impact energy-absorbing material; 5: buffer energy-absorbing cushion; 6: casing pressure relief drilling; 7: protective support.

DETAILED DESCRIPTION OF THE EMBODIMENTS

In order to make the objectives, solutions and advantages of the embodiments of the present application clearer, the solutions of the embodiments of the present application are clearly and completely described below. It should be noted that the embodiments described below are a part of the embodiments of the present application, but not all the embodiments. Based on the embodiments of the present application, all other embodiments obtained by those of ordinary skill in the art without creative efforts are within the scope of protection of the present application.

A three-level prevention and control method for roadway rock burst according to the present application is described below with a reference to FIG. 1, which includes:

before digging a roadway, pre-weakening a thick and hard rock stratum above the roadway, where the thick and hard rock stratum can be a hard top plate 30 m to 80 m above coal seam;

during digging the roadway, performing a pre-stress support, a pressure relief, and a reinforcement; and before stoping at working-face, transferring a stress of an advanced abutment pressure, and arranging a composite energy-absorbing protective structure around the roadway.

In the three-level prevention and control method for roadway rock burst according to the present application, the impact energy and stress on a roadway can be reduced from perspectives of dynamic load and static load by performing pressure relief on far field and near field of surrounding rock of the roadway; capacities of self-bearing and impact resistance of the surrounding rock of the roadway can be improved by using an active support combined with surrounding rock structure remodeling technology; and an energy dissipation capacity in a roadway space is improved by using the composite energy-absorbing protective structure, and a balance between the impact energy and dissipated energy of the roadway is finally reached. In the present application, an energy dissipation process of the rock burst roadway is changed from unstable, disorderly and uncontrollable dissipation state to stable, orderly and controllable dissipation state by coordinating a spatio-temporal relationship between pressure relief, support, and protection.

In an embodiment, before digging the roadway, the pre-weakening the thick and hard rock stratum above the roadway includes: before digging the roadway, pre-weakening the thick and hard rock stratum above the roadway by using a regional staged hydraulic fracturing technology of long borehole, to reduce an integrity and a release strength of accumulated elastic energy of the thick and hard rock stratum. By using regional staged hydraulic fracturing technology in the form of long borehole or ground borehole, a working pressure is up to 70 MPa, a flow rate of fracturing fluid is 0.6 m³/min~1.5 m³/min, and a fracture radius of a single hole is greater than 40 m, which can implement regional fracturing and can process the hard top plate 30 m~80 m above the coal seam, to change caving characteristic of overlying stratum, reduce released energy of broken hard rock, and reduce affected range and transferred stress of rotation of thick and hard rock.

In an embodiment, during digging the roadway, the performing the pre-stress support, the pressure relief, and the reinforcement includes: during digging the roadway, performing the pre-stress support by using a bolt rod and/or a bolt cable, arranging casing pressure relief drilling 6, and performing the pressure relief by casing drilling and performing the reinforcement by grouting. In the present embodiment, the bolt rod or bolt cable with characteristics of high pre-stress, high strength, high elongation and high impact toughness is adopted and means of the pressure relief by casing drilling and the reinforcement by grouting are combined, to improve an integrity of the surrounding rock of the roadway, inhibit a deterioration of the surrounding rock, effectively prevent a deformation of the surrounding rock of the roadway, and improve an impact resistance of the surrounding rock of the roadway, so as to provide an erection space for protective devices such as a steel shed, a buffer energy-absorbing cushion 5 and a protective support 7. In an embodiment, the type of the bolt rod is CRM700, with a maximum breaking load of more than 340 kN, a yield strength of more than 780 MPa, a breaking strength of more than 890 MPa and an impact absorption energy of more than 145 J. A steel strand with pre-stress adopts high elongation steel strand, with a diameter of 21.8 mm and 1*19 strands structure, a tensile strength of more than 1790 MPa and an elongation of more than 8%.

In an embodiment, before stoping at the working-face, the transferring the stress of the advanced abutment pressure includes: before stoping at working-face, transferring the stress of the advanced abutment pressure by using a local hydraulic fracturing technology of medium and short borehole. By determining a timing and parameters of fracturing, the advanced abutment pressure can be transferred precisely, and the damage caused by fracturing on the surrounding rock within a roadway support scope can be avoided. In the present application, local hydraulic fracturing technology of medium and short borehole with a working pressure of 60 MPa can meet general requirements of fracturing on hard top plate underground. A staged fracturing technology of long borehole is mainly used to eliminate strong impact kinetic energy released by a broken hard rock stratum in a far field of the roadway. A fracturing technology of short borehole is used to transfer high concentrated stress in a near field of the surrounding rock of the roadway. By performing the far field hydraulic fracturing and near field hydraulic fracturing on the surrounding rock of the rock burst roadway, a high static load and dynamic load that cause an impact on the roadway are reduced, and the roadway turns to a collaborative anti-impact roadway.

In an embodiment, the arranging the composite energy-absorbing protective structure around the roadway includes: arranging a protective support 7 in the roadway and filling a buffer energy-absorbing cushion 5 between the protective support 7 and the surrounding rock of the roadway. In the present embodiment, the protective support 7 and the buffer energy-absorbing cushion 5 are used for space protection, and the protective support 7 is a frame structure formed of splayed columns. In an embodiment, the protective support 7 is 2600 mm-4200 mm in height, 430 mm in width, 3091 kN of initial support, and 4200 kN of working resistance. Atop beam of the protective support 7 is provided with an anti-impact energy-absorbing material 4 which can absorb energy generated by an impact from a top plate and a bottom plate. The top beam and bottom beam of the protective support 7 are respectively provided a hinged triangular anti-impact device which can prevent the top beam and bottom beam from breaking when being impacted by the top plate and the bottom plate. The protective support 7 adopts a form of column anti-impact hitch and high-strength single-telescopic anti-impact column to prevent the column from breaking when being impacted. A large flow hydraulic control system and a large flow safety valve can absorb impact energy by quickly opening a flow valve. The arrangement form of splayed columns is more conducive to preventing from being impacted by the bottom plate. Since impact occurs in all directions around the roadway and a use of energy-absorbing component alone requires strict impact direction, in addition to providing energy-absorbing component on the steel shed and the protective support 7, a buffer energy-absorbing cushion 5 can be filled between the steel shed, the protective support 7 and the surrounding rock, to absorb impact kinetic energy from all directions around the roadway. The buffer energy-absorbing cushion 5 can effectively attenuate impact stress and prolong impact time, to reduce damage effect of impact dynamic load on surrounding rock and supporting structure.

Based on the above embodiments, in the three-level prevention and control method for roadway rock burst according to the present application, based on means of roadway pressure relief and impact prevention, combined with technologies of repeated pressure relief by casing drilling and the reinforcement by grouting, the integrity of surrounding rock can recover before a sharp deterioration of roadway surrounding rock to prevent the pre-stressed bolt rod or bolt cable support from invalidation. And by combining with composite energy-absorbing protective structure such as the steel shed, the buffer energy-absorbing cushion 5 and the protective support 7, a coordinated prevention and control of "pressure relief-support-protection" on the roadway is achieved.

Based on the above embodiments, as shown in FIG. 1, in the present application, a long hole hydraulic fracturing 1 and a medium and short hole hydraulic fracturing 2 are rationally arranged in space and time for pressure relief, which reduces a high lateral abutment pressure of the roadway, improves a release form of high elastic energy accumulated by thick and hard rock stratum and improves an anti-deformation and anti-impact capacity of the surrounding rock through a pre-stressed bolt mesh cable support 3 technology. And by combining with composite energy-absorbing structures such as steel shed, buffer energy-absorption cushion 5 and protective support 7, an energy dissipation capacity in a roadway space is improved, and a balance between impact energy and dissipation energy of the roadway is finally reached. In the present application, by scientifically coordinating the spatio-temporal relationship between pressure relief, support and protection, an energy dissipation process of the rock burst roadway is changed from unstable, disorderly and uncontrollable dissipation state to stable, orderly and controllable dissipation state.

Finally, it should be noted that the above embodiments are only used to illustrate the solutions of the present application, rather than limiting the solutions. Although the present application is described in detail with reference to the above embodiments, those of ordinary skill in the art should understand that: they can still modify the solutions recorded in the above embodiments, or make equivalent replacements to some of the features; these modifications or replacements do not make the essence of the corresponding solutions depart from the scope of the solutions of various embodiments of the present application.

What is claimed is:

1. A three-level prevention and control method for roadway rock burst, comprising:
    before digging a roadway, pre-weakening a thick and hard rock stratum above the roadway using a regional staged hydraulic fracturing technology of long borehole;
    during digging the roadway, performing a pre-stress support, a pressure relief, and a reinforcement; and
    before stoping at working-face, transferring a stress of an advanced abutment pressure using a local hydraulic fracturing technology of medium and short borehole, and arranging a composite energy-absorbing protective structure around the roadway.

2. The three-level prevention and control method for roadway rock burst according to claim 1, wherein during digging the roadway, the pre-stress support is performed by using a bolt rod and/or a bolt cable, the pressure relief is performed by casing drilling and the reinforcement is performed by grouting.

3. The three-level prevention and control method for roadway rock burst according to claim 1, wherein the arranging the composite energy-absorbing protective structure around the roadway comprises: arranging a protective support in the roadway and filling a buffer energy-absorbing cushion between the protective support and a surrounding rock of the roadway.

4. The three-level prevention and control method for roadway rock burst according to claim 3, further comprising: providing an anti-impact energy-absorbing material on a top beam of the protective support.

5. The three-level prevention and control method for roadway rock burst according to claim 3, further comprising: arranging a hinged triangular anti-impact device on a top beam of the protective support, and on a bottom beam of the protective support, respectively.

6. The three-level prevention and control method for roadway rock burst according to claim 3, wherein the protective support is a frame structure formed of splayed columns.

* * * * *